No. 821,063. PATENTED MAY 22, 1906.
D. S. SEYMOUR.
LUBRICATING DEVICE.
APPLICATION FILED MAY 4, 1904.
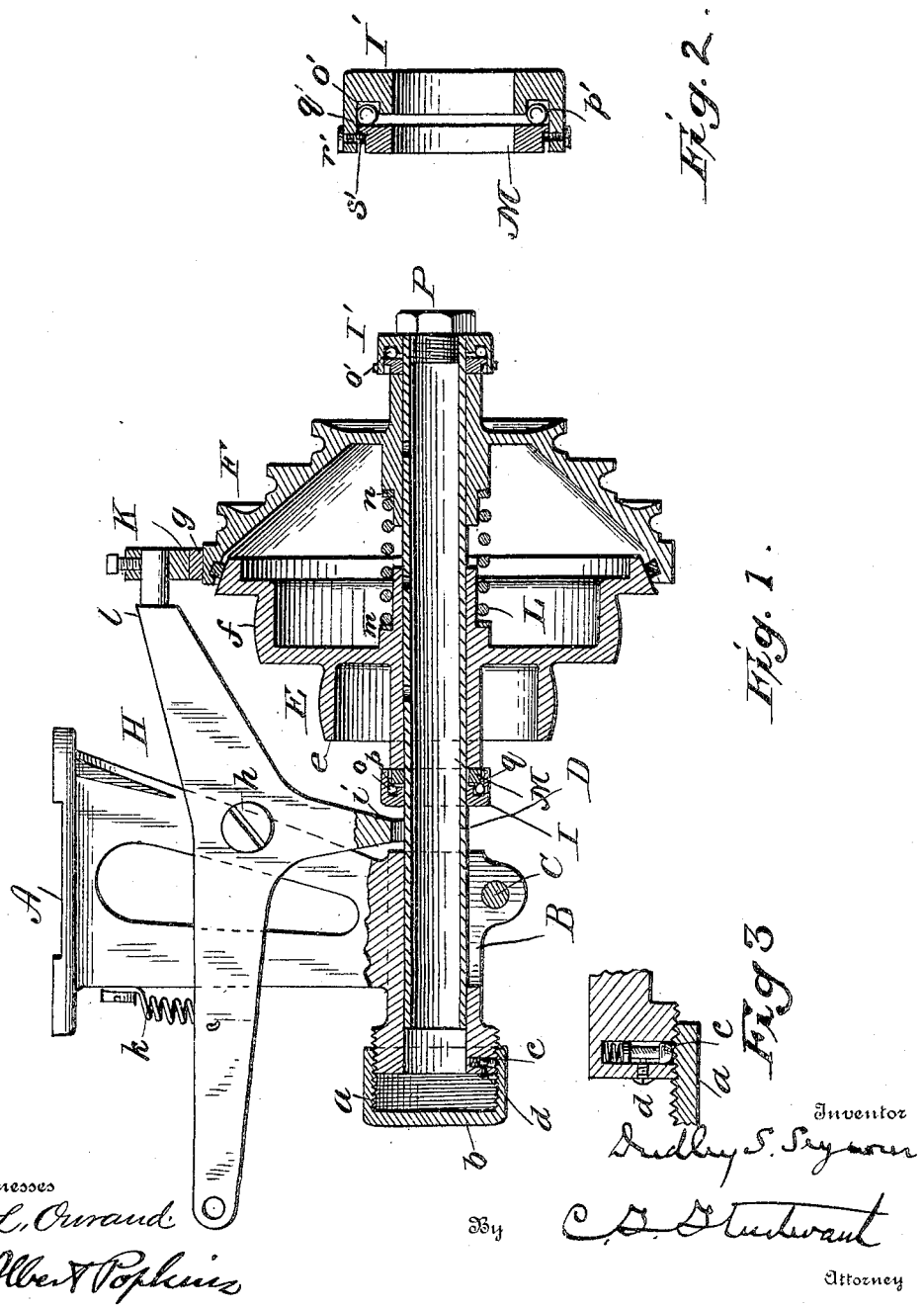

UNITED STATES PATENT OFFICE.

DUDLEY S. SEYMOUR, OF OAK PARK, ILLINOIS, ASSIGNOR TO UNION SPECIAL SEWING MACHINE COMPANY, OF CHICAGO, ILLINOIS, A CORPORATION OF ILLINOIS.

LUBRICATING DEVICE.

No. 821,063.  Specification of Letters Patent.  Patented May 22, 1906.

Application filed May 4, 1904. Serial No. 206,278.

*To all whom it may concern:*

Be it known that I, DUDLEY S. SEYMOUR, a citizen of the United States, residing at Oak Park, in the county of Cook, State of Illinois, have invented certain new and useful Improvements in Lubricating Devices, of which the following is a description, reference being had to the accompanying drawings and to the letters of reference marked thereon.

This invention relates to lubricating devices, and while designed more particularly for use in connection with power-transmitting devices for sewing and other light machines it will be understood that it may be applied to various other mechanisms.

The principal object of the invention is to provide a novel form of lubricating device in which a constant supply of lubricant is forced from a suitable reservoir to the parts to be lubricated, the reservoir being formed in part by the carrying shaft or spindle of the mechanism and the parts being of such construction as to permit ready cleansing and adjustment when required.

With these and other objects in view the invention consists in the novel construction and arrangement of parts hereinafter described, and particularly pointed out in the appended claims.

The invention is illustrated in the accompanying drawings, in which—

Figure 1 is a vertical sectional view of a lubricating device constructed in accordance with the invention. Fig. 2 is a detail sectional view of one of the thrust-bearings on an enlarged scale, and Fig. 3 is a detail view of the locking device for the cap of the lubricant-reservoir.

The mechanism is mounted on a supporting-frame A, which may be held in the usual manner by screws or bolts to the under side of the bench or table on which the machine is placed.

The lower end of the frame is provided with a sleeve B, arranged for the reception of a longitudinally-adjustable hollow shaft D, which, in connection with a portion of the sleeve B, forms a lubricant-reservoir, the volume of which is altered when the shaft is moved endwise in either direction. The sleeve is split for a portion of its length, and the parts are connected by a bolt C, which may be tightened in order to firmly clamp the shaft in any position to which it may be adjusted.

The outer end of the sleeve is enlarged and provided with external screw-threads for the reception of an internally-threaded cap *a*, which is also filled with lubricant and serves as a means for forcing the lubricant forward through the hollow shaft. In the enlarged portion of the sleeve is an approximately radial passage in which is guided a spring-pressed pin *c*, the outer end of which bears against the threaded inner face of the cap and prevents its jarring loose in the action of the apparatus. The pin is held from displacement by a screw *d*.

On the hollow shaft are mounted two loose pulleys E and F, the hubs of which are held from longitudinal displacement by thrust-bearings I I', and at points within the lengths of the hubs the hollow shaft is provided with openings *k* for the passage of the lubricant. The thrust-bearing I' at the end of the shaft is held in place by the head of a screw P, the threaded portion of which screws into internal threads in the bore of the shaft, the screw also serving as one of the end walls of the lubricant-reservoir.

The removal of the cap *a* and screw P leaves the reservoir open from end to end, and it may be readily cleaned or any foreign substances removed when necessary. The adjustment of the shaft in the direction of its length will alter the volume of the reservoir, and the turning of the cap in the proper direction will force the lubricant to flow through the openings *k* in the wall of the reservoir into contact with the hubs to be lubricated.

Having thus described my invention, what I claim as new, and desire to secure by Letters Patent, is—

1. In a lubricating device, a frame having a clamping-collar and provided at one end with an enlarged portion, means for closing one end of said enlarged portion, a hollow shaft, having one end clamped on said collar, the opposite end of said shaft being closed; substantially as described.

2. In a lubricating device, a frame having a clamping-collar forming a part of the lubricant-reservoir, an adjustable means closing one end of said collar, and a hollow shaft held on said collar and forming also a part of the reservoir, longitudinal adjustment of the shaft serving to vary the area of said reservoir; substantially as described.

3. In a lubricating device, a frame having a clamping-collar and provided at one end with an enlarged threaded portion, a hollow shaft held by the collar and forming in connection with said collar a lubricant-reservoir the area of which is increased or diminished by longitudinal adjustment of said hollow shaft and a lubricant-feeding cap mounted on the threaded portion of said collar.

4. In a lubricating device, a frame having a clamping-collar and provided at one end with an enlarged threaded portion, a lubricant-feeding cap screwed onto said threaded portion, a spring-pressed locking-pin arranged in a guiding-recess in said enlarged portion and bearing against the threaded portion of the cap, a hollow shaft clamped in said collar, and a removable screw at the outer end of the shaft and constituting one of the end walls of the reservoir.

In testimony whereof I affix my signature in presence of two witnesses.

DUDLEY S. SEYMOUR.

Witnesses:
C. McNeil,
F. S. North.